Figure 1:
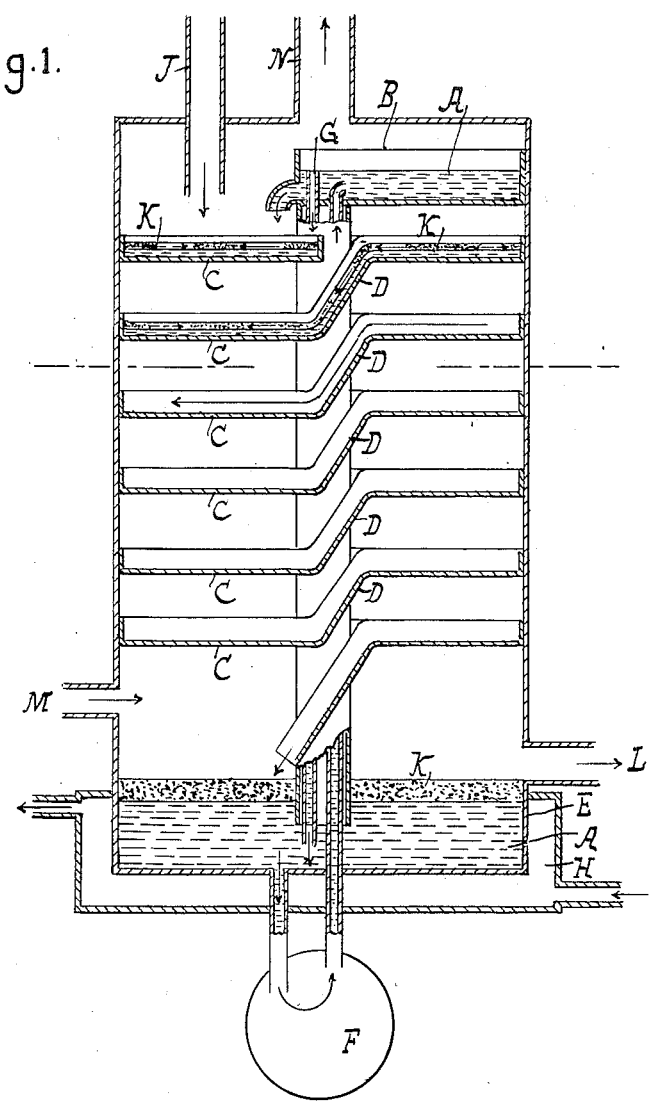

June 28, 1932.   W. GAUS   1,865,183
APPARATUS FOR TREATING SOLID AND LIQUID MATERIALS
Filed Oct. 3, 1930   3 Sheets-Sheet 1

INVENTOR
Wilhelm Gaus
BY ATTORNEYS

June 28, 1932. W. GAUS 1,865,183
APPARATUS FOR TREATING SOLID AND LIQUID MATERIALS
Filed Oct. 3, 1930 3 Sheets-Sheet 2
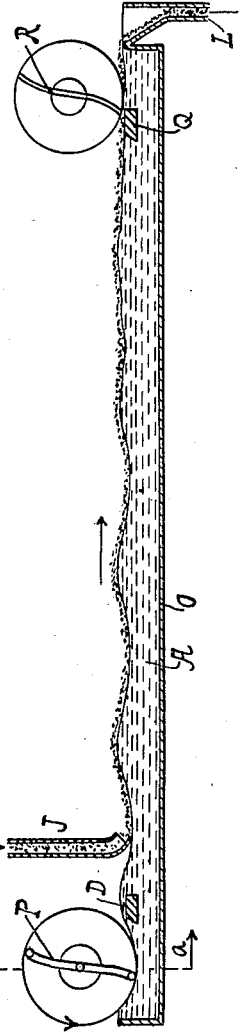
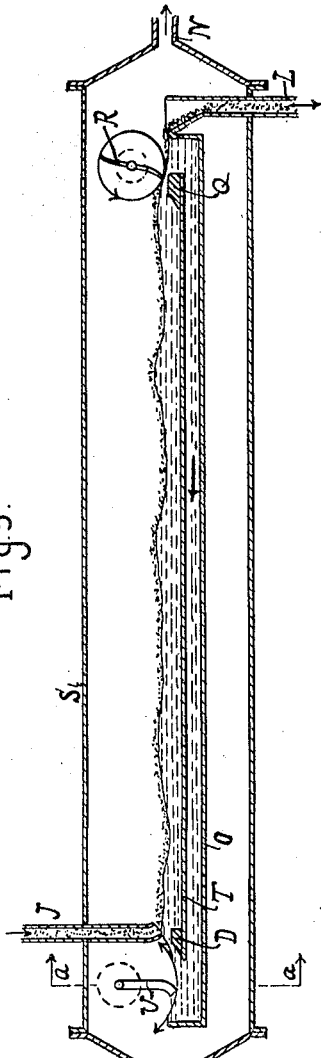
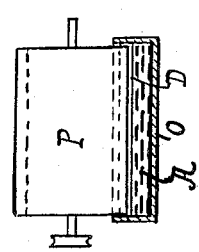
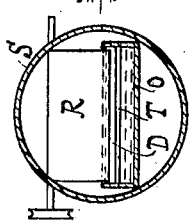
INVENTOR
Wilhelm Gaus
BY ATTORNEYS June 28, 1932.   W. GAUS   1,865,183
APPARATUS FOR TREATING SOLID AND LIQUID MATERIALS
Filed Oct. 3, 1930   3 Sheets-Sheet 3
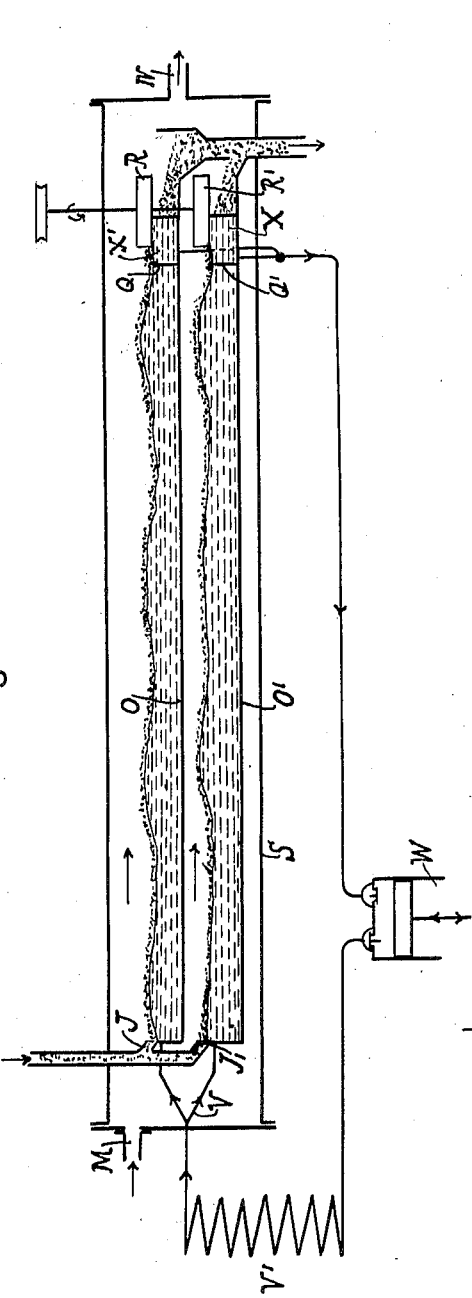
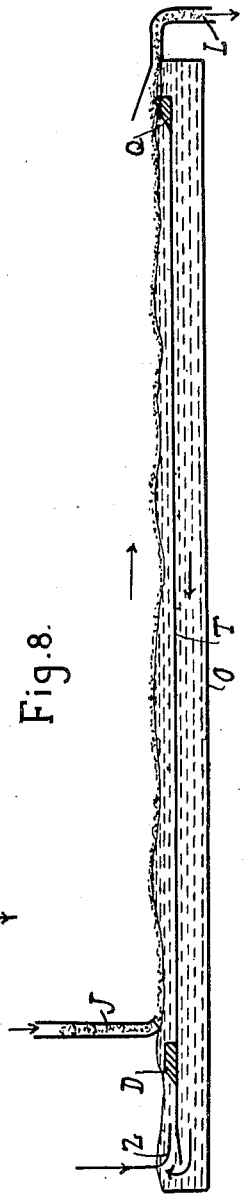
INVENTOR
Wilhelm Gaus
BY ATTORNEYS Patented June 28, 1932

1,865,183

UNITED STATES PATENT OFFICE

WILHELM GAUS, OF HEIDELBERG, GERMANY, ASSIGNOR TO I. G. FARBENINDUSTRIE AKTIENGESELLSCHAFT, OF FRANKFORT-ON-THE-MAIN, GERMANY

APPARATUS FOR TREATING SOLID AND LIQUID MATERIALS

Application filed October 3, 1930, Serial No. 486,274, and in Germany October 5, 1929.

The present invention relates to an apparatus for treating solid and liquid materials.

Many difficulties frequently arise in the continuous treatment of solid or liquid materials. Pulverulent materials or materials which form dust during the treatment usually give rise to inconvenience by reason of the formation of clouds of dust. In cases when it is desirable or necessary to spread out the materials in thin layers during the treatment it is usually very difficult to render possible the continuous formation and to ensure the continuous maintenance of the thin layers while simultaneously moving them. In endothermic or exothermic reactions, the supply or withdrawal of heat is difficult and, as a rule, cannot be effected without injurious overheating.

I have now found that a continuous treatment of non-gaseous, i. e. solid or liquid materials can be carried out advantageously and conveniently while avoiding the difficulties and objections which would otherwise arise by leading the materials through the reaction chamber by means of and floating on an inert liquid medium. The term "inert liquid medium" is meant to comprise liquids which do not take part, or no appreciable part, in the treatment concerned and may only serve for regulating the temperature of the treatment besides conveying the materials.

The liquid medium serving as the substratum and vehicle for the materials to be treated, if necessary preheated or cooled, is allowed to spread out or flow in any thickness, preferably in comparatively thin layers, over horizontal or inclined surfaces which, if desired, may be capable of being heated or cooled. When the liquid medium is used flowing, it is preferably led in circulation, and before its reentry into the reaction chamber heat may be supplied to or withdrawn therefrom, if necessary. By altering the angle of inclination of the surfaces serving as the bases for the flowing liquid medium, by arranging raised pieces on the edges where the liquid flows from one surface to another lower surface, or by increasing or decreasing the amount of the liquid medium or of the materials to be treated supplied, the velocity of throughput and the thickness of the layers of the liquid medium and the materials to be treated may be regulated and may be changed at any time, even during the treatment. It is also possible to extend to any desired extent the time during which the material to be treated is in the reaction chamber by temporarily stopping the supply of the liquid medium. By these means a far reaching regulation of the temperature and also the production of zones of different temperatures within the reaction chamber are rendered possible.

The surfaces, preferably arranged one under the other as closely as possible, which serve as the base for the liquid medium may be arranged continuously in the form of a spiral or may be connected to each other like winding stairs by means of small bridges, preferably sloping, and so constructed that a distribution or flowing of the liquid medium over the entire surface which is as uniform as possible is effected and any clogging up of the materials to be treated is avoided as far as possible.

The separation of the solid or liquid materials to be treated or of the solid or liquid reaction products or residues from the current of the liquid medium may be readily effected by overflows, strippers, skimmers, sedimentation vessels, filters, scrapers and the like.

Gaseous or vaporous substances which are inert or which react with the materials to be treated may be introduced into the reaction chamber. Any gaseous or vaporous reaction products may be withdrawn at the top or bottom of the apparatus or at any intermediate place in the side thereof.

The process according to the present invention may also be carried out in a horizontally disposed elongated vessel through which the liquid medium flows, or in which it is set in an undulatory movement. The liquid medium may be caused to circulate in itself, without any removal from and supply to the vessel if desired so that the upper layer thereof moves in one direction and the lower layer in the opposite direction. A sharper separation of the two layers may be effected by the arrangement of a horizontal intermediate wall, so that the two layers are united only at the two ends of the apparatus. The liquid medium can be moved through the vessel or set in an undulatory movement therein by any mechanical device, such for example a pump, a screw propeller, an endless chain, a to and fro moving scraper acting only in one direction, a bucket wheel, an elastic membrane or the like which devices may be worked electromagnetically. A flowing or undulatory movement of the liquid may also be effected by imparting to the vessel itself or a portion thereof a corresponding motion. A movement of the liquid may also be effected by the continuous or periodic introduction of the supporting liquid or of a gas blown onto or into the liquid, if desired, assisted by introducing the liquid or gas by an injector, or the flowing of the liquid may be effected by warming the liquid at one side of the apparatus, or by several of these means simultaneously. If a gas is introduced this may also be used for operating the aforesaid devices.

The kind, strength and frequency of the impulses imparted to the liquid is chosen in accordance with the effect aimed at and the size and shape of the vessel. The impulses may be imparted regularly, or in irregular periods if standing waves are formed due to the recurrent waves. The speed of the material under treatment may be regulated by suitably choosing the impulses causing the formation of the waves. The period of time during which the material under treatment is kept in the vessel may be varied at will by interrupting the formation of the waves.

If liquid or solid products remain or are formed by the treatment these products may be separated from the supporting liquid at any desired place by the arrangement of devices breaking the waves, strippers, scrapers and the like, or the products may be blown or sucked off by means of a gas.

The passing of the material through the vessel in which it is treated by means of the undulatory movement of the supporting liquid alone has the advantage that less of the said liquid is necessary and means for circulating the liquid are superfluous. Nevertheless a uniform and regulable movement of the material under treatment is ensured.

The container in which the treatment takes place may also be constructed as a pressure vessel. It may be unheated and, if necessary, insulated against the transference of heat. The inner walls of the container may serve as condensing surfaces for any condensable vaporous reaction products formed.

When selecting the liquid medium, the nature of the material to be treated and that of the products formed during the treatment should be taken into consideration. They must not injuriously influence each other, as for example they must not react with each other or dissolve in each other to any great extent, or at least they must be easily separable. As far as possible media should be chosen which influence the course of the reaction in a favourable way, and media which exert an unfavourable catalytic action should be excluded. In some cases, substances which are soluble or capable of being dispersed in the medium and which are catalytically active may be incorporated with the liquid medium. Any liquid or liquefiable inorganic or organic materials, as for example liquid or fused metals or metal alloys, melts of salts or mixtures of salts, salt solutions and the like may be employed as the liquid media. As examples of liquids which may be used for the purpose of the present invention there may be mentioned mercury, fused metals or metal alloys, such as lead and zinc and paraffin.

The process according to the present invention may be utilized for a great variety of treatments of solid or liquid materials, as for example for drying, low temperature carbonization, destructive hydrogenation of coals, simple or fractional distillation or sublimation, cracking or destructive hydrogenation of tars, mineral oils or the like, evaporation of solutions, for the movement of the adsorption masses in the adsorption or purification of gases and for the regeneration of such masses, for the conversion of salt mixtures into double salts, for the treatment of metals, metalloids, oxides and salts with gases or liquids and the like.

The nature of the invention will be further described with reference to the accompanying drawings which illustrate an arrangement of apparatus suitable for carrying out the process according to the present invention, but the invention is not restricted to this arrangement.

Figure 2:
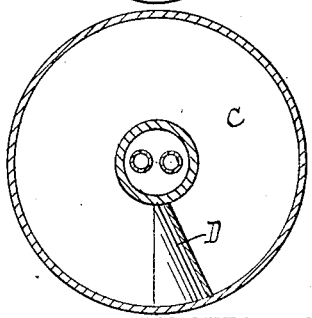

Figure 1 shows diagrammatically a longitudinal section and Figure 2 a cross section through the apparatus. Figures 3, 5, 7 and 8 are longitudinal cross sections of apparatus through which the material to be treated is passed by means of an undulatory movement of the supporting liquid, Figures 4 and 6 being cross sections of the apparatus shown in Figures 3 and 5 respectively on lines $a\ a$ thereof.

In the apparatus shown in Figure 1 the liquid medium A flows from an upper reservoir B on to an upper horizontal surface C, spreads itself out thereon, and flows over the weir D, it then flows in succession over all the other surfaces C and weirs D and finally flows into a lower reservoir E from which it is continually pumped back into the upper reservoir B by a pump F. The level of the liquid medium A in the upper reservoir B is kept constant by an overflow G. The lower reservoir E is provided with means H for heating or cooling the liquid medium A. The material K to be treated enters at J, spreads itself out uniformly on the liquid medium on the upper surface C, floats thereon and is moved forward thereby. The treated material or the residue thereof or the reaction products K' collect on the liquid medium A in the lower reservoir E and are withdrawn at L. An inlet pipe for the supply of gases or vapours is provided at M, and the supplied gases or vapours or the gaseous or vaporous reaction products are withdrawn at N.

According to Figure 3 an elongated vessel O of rectangular cross section is partly filled with a liquid medium A into which a paddle-wheel P plunges. On rotation of the paddle-wheel the displaced liquid is thrown over the weir D and sets up an undulatory movement in the liquid A. The solid material fed by pipe J is conveyed by means of the undulatory movement in the direction to the other weir Q over which the waves and the material thereon pass. The conveyed material accumulates outside the weir where the liquid is at rest and is removed from the surface of the liquid by means of the paddle-wheel R through the pipe L.

A similar apparatus is shown in Figure 5 according to which a horizontally disposed intermediate wall T is provided within the liquid, the two weirs rising to the level of the liquid being connected to said wall. The waves are generated by means of the paddle U quickly moving in the direction of the waves and slowly in the opposite direction. An undulatory movement is set up above the wall T and the material fed by J is moved forward thereby. The material is removed from the liquid by means of the paddle-wheel R towards L. The liquid passing over the weir Q returns below the wall T so that the whole liquid circulates through the vessel. The chamber S which may be heated externally surrounds the apparatus, reaction or scaveninging gases, under pressure if desired, being supplied to and removed from the chamber S at M and N respectively.

In the apparatus shown in Figure 7 two rectangular vessels O and O' partly filled with a liquid medium are arranged one above the other. The liquid is fed by jerks at V by means of the pump W, so that flowing waves are set up conveying the material fed at J. At the other end weirs Q and Q' are provided rising up to the level of the liquid. The liquid passing over the said weirs collects at X and X' whence it passes to the pump W. The scrapers R and R' remove the material from the liquid, the material then being passed off at L. The vessels are arranged in a chamber S provided with gas intake and outlet M and N. In the coil Y the liquid may be heated or cooled.

Figure 8 is a longitudinal section of a vessel provided with weirs D and Q and an intermediate wall T in the manner described with respect to Figure 5. The undulatory movement of the liquid is caused by blowing a gas, preferably periodically, into the liquid by means of the injector Z. The material fed at J is conveyer by means of the waves and the circulating liquid which returns below the wall T. The material may be removed from the liquid at L by means of an exhauster. Such removal is particularly suitable with materials of low specific gravity.

What I claim is:

1. Apparatus for the continuous treatment of non-gaseous materials, comprising a horizontally disposed elongated vessel, a liquid medium in said vessel, means at one end of said vessel, for imparting an undulatory movement to said liquid, a supply near said means and at the inner side thereof, for passing non-gaseous material on to said liquid, and means at the other end of said vessel for removing non-gaseous material from the surface of said liquid.

2. Apparatus for the continuous treatment of non-gaseous materials, comprising a horizontally disposed elongated vessel, a liquid medium in said vessel, two weirs near the ends of said vessel rising up to the level of said liquid, means on the outer side of one of said weirs for throwing waves of said liquid over said weir, a supply near to and at the inner side of said weir for passing non-gaseous material on to said liquid, and means near to and at the outer side of the other weir for removing non-gaseous material from the surface of said liquid.

3. Apparatus for the continuous treatment of non-gaseous materials, comprising a horizontally disposed elongated vessel, a liquid medium in said vessel, two weirs near the ends of said vessel rising up to the level of said liquid and plunging into said liquid to about half of the depth thereof, an intermediate wall extending from the lower part of one weir to the lower part of the other weir parallel to the surface of the liquid, means on the outer side of one of said weirs for throwing waves of said liquid over said weir, a supply near to and at the inner side of said weir for passing non-gaseous material on to said liquid, and means near to and at the outer side of the other weir for removing non-gaseous material from the surface of said liquid.

4. Apparatus for the continuous treatment of non-gaseous materials, comprising a horizontally disposed elongated vessel, a liquid medium in said vessel, two weirs near the ends of said vessel rising up to the level of said liquid and plunging into said liquid to about half of the depth thereof, an intermediate wall extending from the lower part of one weir to the lower part of the other weir parallel to the surface of the liquid, means on the outer side of one of said weirs for throwing waves of said liquid over said weir, a supply near to and at the inner side of said weir for passing non-gaseous material on to said liquid, means near to and at the outer side of the other weir for removing non-gaseous material from the surface of said liquid, a chamber surrounding said elongated vessel, and means for passing a gas into and from said chamber.

In testimony whereof I have hereunto set my hand.

WILHELM GAUS.